(12) United States Patent
Okazaki et al.

(10) Patent No.: US 8,812,214 B2
(45) Date of Patent: Aug. 19, 2014

(54) CONTROL DEVICE FOR INTERNAL COMBUSTION ENGINE

(75) Inventors: Shuntaro Okazaki, Sunto-gun (JP); Satoshi Yoshizaki, Gotemba (JP); Kaoru Shokatsu, Susono (JP); Masashi Shibayama, Sunto-gun (JP); Hajime Kawakami, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/878,831

(22) PCT Filed: Oct. 12, 2010

(86) PCT No.: PCT/JP2010/067871
§ 371 (c)(1),
(2), (4) Date: Apr. 11, 2013

(87) PCT Pub. No.: WO2012/049729
PCT Pub. Date: Apr. 19, 2012

(65) Prior Publication Data
US 2013/0191010 A1 Jul. 25, 2013

(51) Int. Cl.
*B60T 7/12* (2006.01)

(52) U.S. Cl.
USPC ........... 701/103; 701/105; 701/114; 123/434; 123/406.23; 123/406.47

(58) Field of Classification Search
CPC ..... F02D 41/0082; F02D 41/34; F02D 41/36; F02D 37/02
USPC .......... 701/103–105, 111, 114, 115; 123/434, 123/681, 683, 478, 480, 406.11, 406.23, 123/406.47, 406.52

See application file for complete search history.

(56) References Cited

U.S. PATENT DOCUMENTS

| 6,758,185 B2 * | 7/2004 | Surnilla et al. ............. 123/198 F |
| 2006/0154784 A1 * | 7/2006 | Surnilla et al. ................ 477/111 |
| 2010/0211287 A1 * | 8/2010 | Ohtsuka et al. ............... 701/102 |

FOREIGN PATENT DOCUMENTS

| DE | 10326889 A1 | 12/2004 |
| EP | 1270915 A2 | 1/2003 |
| JP | 2002-47985 A | 2/2002 |
| JP | 2008-038866 A | 2/2008 |
| JP | 2008-121537 A | 5/2008 |
| JP | 2010-007489 A | 1/2010 |
| JP | 2010-053826 A | 3/2010 |
| WO | 2008/056826 A1 | 5/2008 |

\* cited by examiner

*Primary Examiner* — John Kwon
(74) *Attorney, Agent, or Firm* — Kenyon & Kenyon LLP

(57) ABSTRACT

An internal combustion engine control device the present invention provides is a control device that can realize both of request torque and a request A/F for each of cylinder groups with high precision, even when the request A/F differs at each of the cylinder groups. The present control device sets a reference A/F within a range from the leanest A/F to the richest A/F out of the request A/Fs to the respective cylinder groups. The present control device calculates a target air quantity for realizing the request torque under the reference A/F, based on data that defines a relation between engine output torque and an air quantity in relation to an A/F. The present control device controls a throttle opening in accordance with the target air quantity, and controls fuel injection amounts of the respective cylinders in accordance with the request A/F s to the respective cylinder groups.

8 Claims, 5 Drawing Sheets

US 8,812,214 B2

CONTROL DEVICE FOR INTERNAL COMBUSTION ENGINE

CROSS REFERENCE TO RELATED APPLICATIONS

This is a 371 national phase application of PCT/JP2010/067871 filed 12 Oct. 2010, the contents of which are incorporated herein by reference.

TECHNICAL FIELD

The present invention relates to a control device for an internal combustion engine, and more particularly to a control device that is suitable for use in the internal combustion engine which can be operated with a different air-fuel ratio at each of a plurality of cylinder groups, and is configured to control amounts of air taken into respective cylinders of the plurality of cylinder groups with one throttle.

BACKGROUND ART

Ordinary internal combustion engines for vehicles include multiple-cylinder internal combustion engines having multiple cylinders. In multiple-cylinder internal combustion engines, cylinders are divided into a plurality of groups, and an exhaust emission purifying device is installed at each of the plurality of cylinder groups in some cases. For example, in the V-type engine described in Japanese Patent Laid-Open No. 2008-038866, the exhaust emission purifying device can be installed at each of the left and the right banks. In such a case, from the viewpoint of emission performance, the air-fuel ratio is desirably controlled for each of the cylinder groups. That is to say, it is desirable to set a request air-fuel ratio for each of the cylinder groups and control fuel injection amounts of the respective cylinders in accordance with the request air-fuel ratios to the respective cylinder groups.

An important control variable of an internal combustion engine as well as the air-fuel ratio described above is the torque generated by the internal combustion engine. For example, Japanese Patent Laid-Open No. 2010-007489 and Japanese Patent Laid-Open No. 2010-053826 each disclose the method that acquires the request torque and the request air-fuel ratio to the internal combustion engine, and determines the respective control variables of the throttle, the ignition device, and the fuel injection device, in order to realize the request torque and the request air-fuel ratio. Concerning the throttle, a throttle opening which is the operation variable thereof is determined in accordance with the target air quantity for realizing the request torque. By using, for example, the inverse model of an air model, the throttle opening which is necessary for realization of the target air quantity can be obtained by calculation.

Incidentally, an air-fuel ratio is also closely related to the torque which an internal combustion engine generates, in addition to the quantity of the air taken into the cylinder. When the air quantities are the same, if the air-fuel ratio of the air-fuel mixture which is provided for combustion is leaner than stoichiometry, the torque decreases, and if the air-fuel ratio of the air-fuel mixture which is provided for combustion is richer, the torque increases. Therefore, in the process of converting the request torque into a target air quantity, the air-fuel ratio, that is, the request air-fuel ratio, of the air-fuel mixture in the cylinders is desirably referred to. By setting the target air quantity in response to the request air-fuel ratio, achievability of the request torque can be enhanced.

However, in the above case, the problem as follows arises. Even in the case of the internal combustion engine which has a plurality of cylinder groups like a V-type engine, one throttle is used in general, and the throttle is shared by a plurality of cylinder groups. Therefore, the target air quantities for a plurality of cylinder groups have to be realized by operation of the one throttle. When the request air-fuel ratios differ between the cylinder groups, the target air quantities which are determined with reference to the request air-fuel ratios differ between the cylinder groups. If the target air quantities differ between the cylinder groups, the target throttle openings which are required for realization thereof are also set at different values. As a result, the target throttle opening which is used in operation of the throttle varies from one cylinder to another during one cycle.

In FIG. 6, a state thereof is shown in charts. A chart in an uppermost stage shows a change with time of request torque. A second chart shows a change with time of a request air-fuel ratio for a right bank. A third chart shows a change with time of a request air-fuel ratio for a left bank. A chart in a lowermost stage shows a change with time of a target throttle opening. In the case shown in FIG. 6, the request air-fuel ratios are made rich both at the left and the right banks as an initial state, and at a time point t1, only the request air-fuel ratio of the right bank is returned to stoichiometry. Thereafter, at a time point t2, the request air-fuel ratio of the left bank is also returned to stoichiometry. That is to say, in the case shown in FIG. 6, during a time period from the time point t1 to the time point t2, the request air-fuel ratios differ between the left and the right banks.

In the engine having left and right banks, the request air-fuel ratios of the left and the right banks are alternately read in accordance with the ignition sequence when the target throttle opening is calculated from the target air quantity. The target air quantity is determined with reference to the request air-fuel ratio, and therefore, during the time period from the time point t1 to the time point t2, the target air quantity oscillatorily changes in response to the request air-fuel ratios which are read. As a result, the target throttle opening which is converted from the target air quantity also shows an oscillatory change as shown in the chart on the lowermost stage of FIG. 6.

When the target throttle opening varies as shown in FIG. 6, the throttle is oscillatorily moved at a high frequency. However, a change of the air quantity with respect to the operation of the throttle has a response delay, and therefore, the oscillatory operation of the throttle may make the air quantity unstable. As a result, not only the achievability of the request torque and the request air-fuel ratio declines due excess or deficiency of the air quantity, but also extreme excess or deficiency of the air quantity could cause worsening of combustion. Further, there is the fear that the request air-fuel ratios to the respective banks on the left and the right cannot be realized with sufficiently high precision.

CITATION LIST

Patent Literatures

Patent Literature 1: Japanese Patent Laid-Open No. 2010-007489
Patent Literature 2: Japanese Patent Laid-Open No. 2010-053826
Patent Literature 3: Japanese Patent Laid-Open No. 2008-038866

SUMMARY OF INVENTION

The present invention has an object to be able to realize both request torque and a request air-fuel ratio for each of cylinder groups with high precision even when the request air-fuel ratio differs at each of the cylinder groups. In order to attain the object like this, the present invention provides a control device for an internal combustion engine as follows.

The control device that the present invention provides has, as a control target, an internal combustion engine that can be operated with a different air-fuel ratio at each of a plurality of cylinder groups, and is configured to control quantities of air taken into respective cylinders of the plurality of cylinder groups with one throttle. As the internal combustion engine like this, for example, a V-type engine in which an exhaust system is provided at each of left and right banks is cited. Further, even in the case of an inline type engine, for example, if an exhaust system of some cylinders is provided as a separate system from an exhaust system of other cylinders, such an internal combustion engine can be included in the control target of the present control device.

The present control device acquires request torque to the internal combustion engine, and acquires a request air-fuel ratio to each of a plurality of cylinder groups. The present control device sets a reference air-fuel ratio within a range from the leanest air-fuel ratio to the richest air-fuel ratio out of the request air-fuel ratios to the respective cylinder groups. Accordingly, if the request air-fuel ratios to the respective cylinder groups are the same, the reference air-fuel ratio is also set at the same as the request air-fuel ratio.

As a preferable method for setting the reference air-fuel ratio, the present control device can select at least the following three methods. According to a first method, the control device sets an air-fuel ratio obtained by averaging the request air-fuel ratios to the cylinder groups as the reference air-fuel ratio. According to a second method, the control device sets an air-fuel ratio that is the closest to a combustion limit air-fuel ratio out of the request air-fuel ratios to the respective cylinder groups, as the reference air-fuel ratio. According to a third method, when all of the request air-fuel ratios to the respective cylinder groups are apart from the combustion limit air-fuel ratio by a predetermined value or more, the control device sets an air-fuel ratio that is obtained by averaging the request air-fuel ratios to the respective cylinder groups as the reference air-fuel ratio, and when a difference between any one of the request air-fuel ratios to the respective cylinder groups and the combustion limit air-fuel ratio is smaller than the predetermined value, the control device sets an air-fuel ratio that is the closest to the combustion limit air-fuel ratio as the reference air-fuel ratio.

The present control device calculates a target air quantity for realizing the request torque under the aforementioned reference air-fuel ratio, based on data that defines a relation between torque generated by the internal combustion engine and an air quantity in relation to an air-fuel ratio. The control device controls an opening of the throttle in accordance with the target air quantity, and controls fuel injection amounts of the respective cylinders in accordance with the request air-fuel ratios to the respective cylinder groups.

According to the control device including the function as above, the specially set reference air-fuel ratio is used in the calculation of the target air quantity, and the opening of the throttle is controlled in accordance with the target air quantity. Therefore, the operation of the throttle is stabilized, and the air quantities of the respective cylinder groups are also stabilized. In addition to this, the fuel injection amounts of the respective cylinders are controlled in accordance with the request air-fuel ratios to the respective cylinder groups, and therefore, the request air-fuel ratio at each of the cylinder groups is realized with high precision.

Furthermore, the reference air-fuel ratio is within the range from the leanest air-fuel ratio to the richest air-fuel ratio out of the request air-fuel ratios to the respective cylinder groups, and therefore, excess or deficiency of the target air quantity with respect to the air quantity which is truly necessary for realization of the request torque is suppressed to be small. Consequently, according to the present control device, realization of the request torque with precision to a high degree is also enabled.

If the achievability of the request torque is desired to be further enhanced, the ignition timing control as follows is preferably executed in combination. Namely, the actual air quantity which is realized by control of the throttle opening is calculated, and subsequently, based on the data that defines the relation between the torque generated by the internal combustion engine and the air quantity in relation to the air-fuel ratio, the torque which is estimated to be realized by the actual air quantity under the request air-fuel ratio is calculated for each of the cylinder groups. Subsequently, the ignition timing is controlled for each of the cylinder groups to compensate the difference between the estimated torque and the request torque by correction of the ignition timing. At this time, optimal ignition timing to be the reference of correction of the ignition timing is more preferably determined with reference to the request air-fuel ratio for each of the cylinder groups.

DESCRIPTION OF EMBODIMENTS

Embodiment 1

Embodiment 1 of the present invention will be described with reference to the drawings.

An internal combustion engine (hereinafter, an engine) to be a control target in embodiment 1 is a spark ignition type four-cycle reciprocating engine, and is a V-type engine having a left and a right banks. In the engine, an exhaust manifold is installed on each of the banks, and an exhaust emission purifying device, that is, a catalyst, is installed at each of the exhaust manifolds. Meanwhile, intake manifolds at the left and the right banks are integrated, and upstream thereof, a throttle which is shared between the left and the right banks is installed. The control device controls operation of the engine by operating actuators included in the engine. The actuators which can be operated by the control device include an ignition device, a throttle, a fuel injection device, a variable valve timing mechanism, an EGR device and the like. However, it is the throttle, the ignition device and the fuel injection device that the control device operates in the present embodiment, and the control device operates these three kinds of actuators to control the operation of the engine.

The control device of the present embodiment uses torque, an air-fuel ratio and an efficiency as control variables of the engine. The torque mentioned here means illustrated torque in the strict sense of the word, and the air-fuel ratio means an air-fuel ratio of an air-fuel mixture provided for combustion. The efficiency in the present description means a ratio of torque which is actually outputted to potential torque which the engine can output. A maximum value of the efficiency is 1, and at this time, the potential torque which the engine can output is actually outputted directly. When the efficiency is smaller than 1, the torque which is actually outputted is smaller than the potential torque which the engine can output, and the margin mainly becomes heat and is outputted from the engine.

Figure 1:
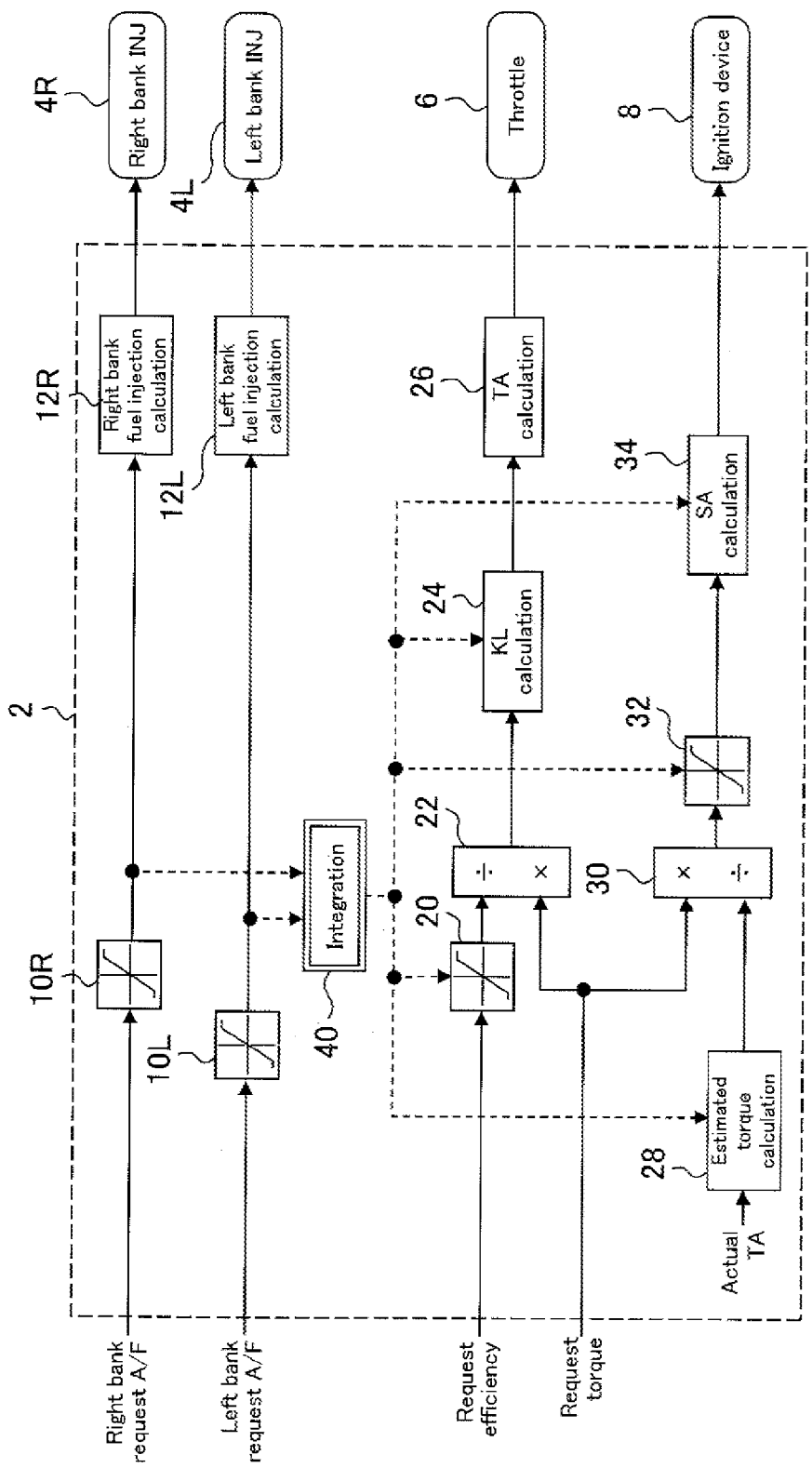
FIG. 1 is a block diagram showing a configuration of a control device of embodiment 1 of the present invention.

A control device 2 shown in a block diagram of FIG. 1 shows a configuration of the control device of the present embodiment. As for respective elements that configure the control device 2 in FIG. 1, only elements relating to torque control and air-fuel ratio control by operation of three kinds of actuators, that is, a throttle 6, an ignition device 8 and fuel injection devices (INJ) 4R and 4J among various functional elements that the control device 2 has, are especially expressed in the drawing. Accordingly, FIG. 1 does not mean that the control device 2 is configured by only these elements. Each of the respective elements may be exclusive hardware, or may share any hardware and may be virtually configured by software. Hereinafter, a configuration of the control device 2 will be described with a particular emphasis on the functions of the respective elements shown in FIG. 1.

First, as request to control variables of the engine, request torque, a request efficiency and request air-fuel ratios (request A/F) to the respective left and right banks are inputted in the present control device. That is to say, four kinds of requests are inputted in the present control device. These requests are supplied from a power train manager which is located at a higher order of the present control device.

The request air-fuel ratios to the respective banks are normally set at stoichiometry, but are changed when it is necessary from the viewpoint of emission performance. More specifically, periodically changing the request air-fuel ratios with stoichiometry as a center in order to enhance the purification performance of catalysts, and changing the request air-fuel ratio by air-fuel ratio feedback control are performed. Further, at a time of restoration from fuel cut, the request air-fuel ratio is made much richer than stoichiometry during a predetermined time period in order to restore an NOx reduction ability of the catalyst quickly. The request air-fuel ratios to the respective banks are not necessarily the same, but are sometimes set at different air-fuel ratios depending on the operation states and the environmental conditions of the left and the right banks.

The request torque is set in accordance with operation conditions and operation states of the engine, more specifically, based on an operation amount of an accelerator pedal by a driver, and signals from a control system of a vehicle such as a VSC and TRC. The request efficiency is set at a value which is smaller than 1 when a temperature of exhaust gas is desired to be increased, and when reserve torque is desired to be made. However, in the present embodiment, the request efficiency is assumed to be set at 1 which is a maximum value.

The request air-fuel ratios to the respective banks which the control device 2 receives are respectively passed to combustion limit guard sections 10R and 10L. The combustion limit guard sections 10R and 10L each limit a maximum value of the request air-fuel ratio which is used in calculation of the fuel injection amount by a combustion limit air-fuel ratio which is a guard value. The combustion limit air-fuel ratios may be the same value in the left and the right banks, or may be set at different values depending on the operation state and the environmental conditions.

The request air-fuel ratios which pass through the combustion limit guard sections 10R and 10L are inputted in fuel injection amount calculating sections 12R and 12L of the left and the right banks. When calculation timing of a fuel injection amount comes in the cylinders which belong to the left bank, the fuel injection amount calculating section 12L for the left bank calculates a fuel injection amount from the request air-fuel ratio to the left bank, and predicted air quantities (predicted load rates) at intake valve closing timing of the cylinders. When calculation timing of the fuel injection amount comes in the cylinders which belong to the right bank, the fuel injection amount calculating section 12R for the right bank similarly calculates the fuel injection amount from the request air-fuel ratio to the right bank and a predicted air quantity at intake valve closing timing of the cylinders. The predicted air quantity can be calculated from a future value of the throttle opening which is obtained by throttle delay control which will be described later, as is already known widely.

The control device 2 performs operation of the fuel injection devices 4R and 4L of the respective banks to realize the fuel injection amounts calculated in the fuel injection amount calculating sections 12R and 12L.

Further, in parallel with the processing described above, the control device 2 carries out processing for setting a reference air-fuel ratio in a reference air-fuel ratio setting section 40. The reference air-fuel ratio setting section 40 integrates the request air-fuel ratios to the left and the right banks, and outputs the integrated air-fuel ratio as a reference air-fuel ratio. The reference air-fuel ratio need only be an air-fuel ratio of a value between the request air-fuel ratio to the left bank and the request air-fuel ratio to the right bank. In the present embodiment, an air-fuel ratio obtained by averaging the request air-fuel ratios to the respective banks is set as the reference air-fuel ratio. The reference air-fuel ratio is an air-fuel ratio that is used in calculation of the respective operation amounts of the actuators other than the fuel injection devices 4R and 4L, that is, the throttle 6 and the ignition device 8, as will be described later.

Meanwhile, the request torque and the request efficiency which the control device 2 receives are inputted in an air quantity controlling torque calculating section 22. The air quantity controlling torque calculating section 22 calculates air quantity controlling torque by dividing the request torque by the request efficiency. When the request efficiency is smaller than 1, the air quantity controlling torque is increased to be larger than the request torque. This means that the throttle 6 is requested to be able to output torque larger than the request torque potentially. However, concerning the request efficiency, the request efficiency which passes through the combustion limit guard section 20 is inputted in the air quantity controlling torque calculating section 22. The combustion limit guard section 20 limits a minimum value of the request efficiency which is used in calculation of the air quantity controlling torque by an efficiency guard value for securing suitable combustion. The guard value, that is, the value of the minimum efficiency with which suitable combustion is secured is influenced by the air-fuel ratio. In the present embodiment, setting of the efficiency guard value of the combustion limit guard section 20 is performed with the aforementioned reference air-fuel ratio as the reference.

The air quantity controlling torque is inputted in a target air quantity calculating section 24. The target air quantity calculating section 24 converts the air quantity controlling torque into a target air quantity (KL) by using an air quantity map. The air quantity mentioned here means an amount of air that is taken into a cylinder (charge efficiency or a load rate, which is obtained by making the air quantity dimensionless can be used instead). The air quantity map is a map in which torque and an air quantity are related to each other with various engine state quantities including an engine speed and an air-fuel ratio as keys, on the precondition that the ignition timing is optimal ignition timing (ignition timing closer to a retard side, out of MBT and trace knock ignition timing). The air quantity map is created based on the data obtained by testing engines. For search of the air quantity map, actual values and target values of the engine state quantities are used. Concerning the air-fuel ratio, in the present embodiment, the aforementioned reference air-fuel ratio is used in map search. Accordingly, in the target air quantity calculating section 24, the air quantity which is necessary for realization of the air quantity controlling torque under the reference air-fuel ratio is calculated as the target air quantity of the engine.

The target air quantity is inputted in a target throttle opening calculating section 26. The target throttle opening calculating section 26 converts the target air quantity (KL) into a throttle opening (TA) by using an inverse model of an air model. The air model is a physical model which is obtained by modeling a response characteristic of the air quantity to the operation of the throttle 6, and therefore, by using the inverse model thereof, the throttle opening which is necessary for achievement of the target air quantity can be inversely calculated.

The control device 2 performs operation of the throttle 6 in accordance with the throttle opening calculated in the target throttle opening calculating section 26. However, in order to make the future value of the throttle opening predictable, throttle delay control is carried out in some cases. In such cases, a deviation corresponding to a delay time period occurs between the target throttle opening which is calculated in the throttle opening calculating section 26 and an actual throttle opening which is realized by the operation of the throttle 6.

The control device 2 carries out calculation of estimated torque based on an actual throttle opening (actual TA) in an estimated torque calculating section 28, in parallel with the above described processing. The estimated torque in the present document is an estimated value of torque which can be outputted when the ignition timing is set at optimal ignition timing under the present throttle opening, that is, the estimated value of torque which the engine can potentially output. The estimated torque calculating section 28 first converts the throttle opening into an estimated air quantity by using a forward model of the aforementioned air model. Next, the estimated torque calculating section 28 converts the estimated air quantity into estimated torque by using a torque map. The torque map is an inverse map of the aforementioned air quantity map, and is a map in which the air quantity and torque are related to each other with various engine state quantities as keys, on the precondition that the ignition timing is optimal ignition timing. In search of the torque map, the aforementioned reference air-fuel ratio is used for search of the map. Accordingly, in the estimated torque calculating section 28, the torque which is estimated to be realized by the estimated air quantity under the reference air-fuel ratio is calculated.

The estimated torque is inputted in an ignition timing controlling efficiency calculating section 30 together with the duplicated target torque. The ignition timing controlling efficiency calculating section 30 calculates a ratio of the target torque to the estimated torque as an ignition timing controlling efficiency. The calculated ignition timing controlling efficiency is inputted in an ignition timing calculating section 34 after passing through a combustion limit guard section 32. The combustion limit guard section 32 limits a minimum value of the ignition timing controlling efficiency by an efficiency guard value which secures combustion. A value of a minimum efficiency with which suitable combustion is secured is influenced by the air-fuel ratio, and therefore, in the present embodiment, setting of the efficiency guard value of the combustion limit guard section 32 is performed with the aforementioned reference air-fuel ratio as a reference.

The ignition timing calculating section 34 calculates ignition timing (SA) from the inputted ignition timing controlling efficiency. In more detail, the ignition timing calculating section 34 calculates optimal ignition timing based on the engine state quantities such as the engine speed, the request torque and the air-fuel ratio, and calculates a retard amount with respect to the optimal ignition timing from the inputted ignition timing controlling efficiency. When the ignition timing controlling efficiency is 1, the retard amount is set as zero, and as the ignition timing controlling efficiency is smaller than 1, the retard amount is made larger. Subsequently, the ignition timing calculating section 34 calculates the result of adding the retard amount to the optimal ignition timing as final ignition timing. For the calculation of the optimal ignition timing, for example, a map in which the optimal ignition timing and various engine state quantities are related to one another can be used. For calculation of the retard amount, for example, a map in which the retard amount, and the ignition timing controlling efficiency and various engine state quantities are related to one another can be used. For search of the maps, the actual value and the target value of the engine state quantities are used. Concerning the air-fuel ratio, the aforementioned reference air-fuel ratio is used for map search.

The control device 2 performs operation of the ignition device 8 in accordance with the ignition timing calculated in the ignition timing calculating section 34.

Figure 2:
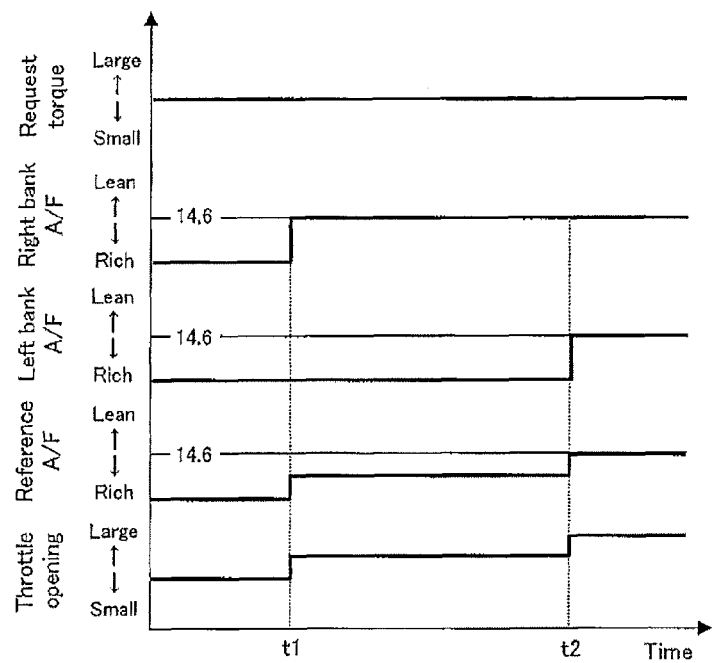
FIG. 2 is a diagram for describing contents of an engine control according to the embodiment 1 of the present invention and control results obtained thereby.

FIG. 2 is a diagram showing a result of the engine control which is realized by the control device 2 in the present embodiment. Hereinafter, an effect in the engine control which is obtained in the present embodiment will be described with use of FIG. 2.

A chart on an uppermost stage of FIG. 2 shows a change with time of the request torque. A second chart shows a change with time of the request air-fuel ratio to the right bank, and a third chart shows a change with time of the request air-fuel ratio to the left bank. A fourth chart shows a change with time of the reference air-fuel ratio which is calculated from the request air-fuel ratios to the respective banks. A chart in a lowermost stage shows a change with time of the target throttle opening. In the case shown in FIG. 2, the request air-fuel ratios are made rich in both the left and the right banks as the initial state, and at a time point t1, only the request air-fuel ratio to the right bank is returned to stoichiometry. Thereafter, at a time point t2, the request air-fuel ratio to the left bank is also returned to stoichiometry. That is to say, in the case shown in FIG. 2, during a time period from the time point t1 to the time point t2, the request air-fuel ratios differ between the left and the right banks.

Figure 6:
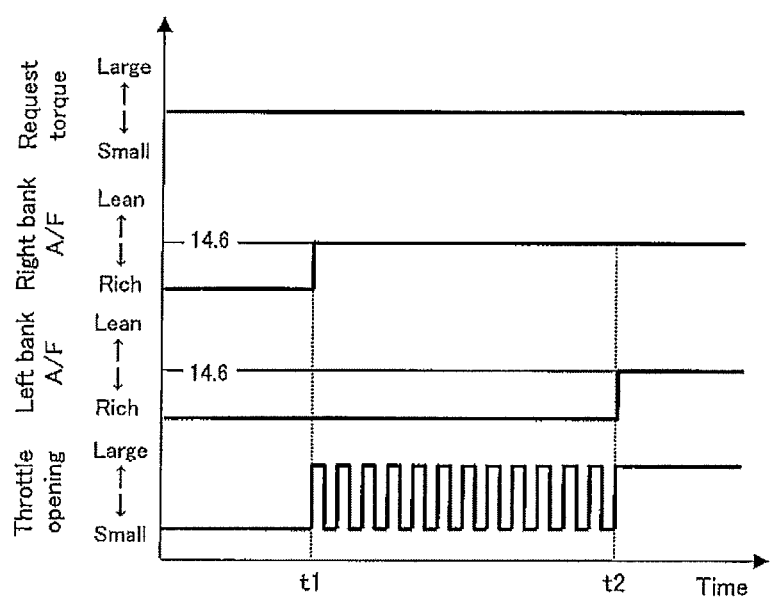
FIG. 6 is a diagram for describing contents of a conventional engine control and control results obtained thereby.

However, in the present embodiment, the target throttle opening is calculated from the target air quantity which is determined by using the reference air-fuel ratio, as described above. Accordingly, as shown in the chart at the lowermost stage of FIG. 2, the target throttle opening does not show the oscillatory change as shown in the chart at the lowermost stage of FIG. 6. Since the throttle 6 is controlled in accordance with the stable target air quantity like this, the operation of the throttle 6 is stabilized, and the air quantities of the respective banks which are controlled by the throttle 6 are also stabilized. In addition thereto, the fuel injection amounts of the respective cylinders are controlled in accordance with the request air-fuel ratios to the banks to which the cylinders belong, and therefore, the request air-fuel ratios to the left and the right banks are both realized with high precision.

Furthermore, according to the present embodiment, the reference air-fuel ratio is the result of averaging the request air-fuel ratios to the left and the right banks, and therefore, the target air quantity which is determined from the reference air-fuel ratio is a substantially average value of the air quantity required in the left bank and the air quantity required in the right bank. Therefore, in one of the banks, the air quantity becomes slightly excessive with respect to the request torque, and in the other bank, the air quantity becomes slightly insufficient with respect to the request torque, but as the entire engine, the torque which is substantially the request torque, or is close to the requested torque is realized Embodiment 2

Embodiment 2 of the present invention will be described with reference to the drawing.

Figure 3:
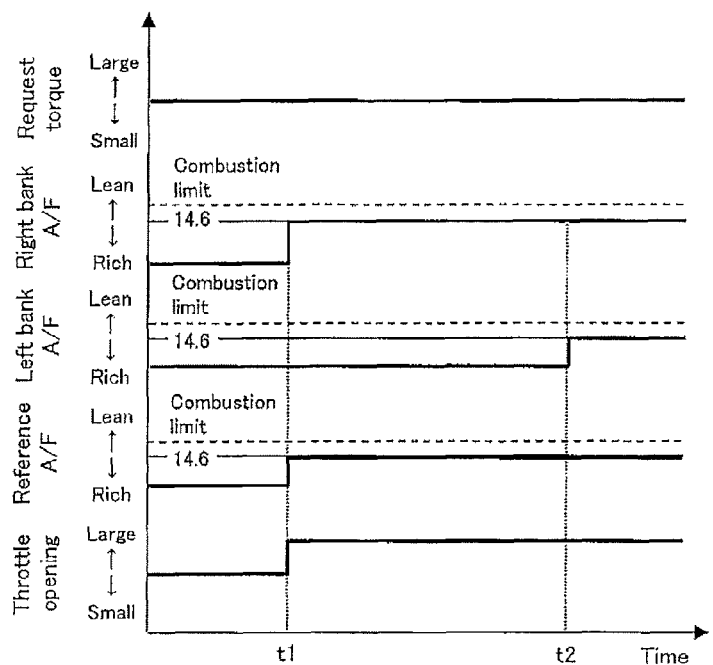
FIG. 3 is a diagram for describing a setting method of a reference air-fuel ratio according to embodiment 2 of the present invention.

The present embodiment and embodiment 1 differ from each other in the method for setting the reference air-fuel ratio by the reference air-fuel ratio setting section 40. In the present embodiment, out of the request air-fuel ratios to the respective banks, the air-fuel ratio which is closer to the combustion limit air-fuel ratio is set as a reference air-fuel ratio. For example, in a case shown in FIG. 3, until the time point t1, the request air-fuel ratios of the left and the right banks are both set to be rich. However, the request air-fuel ratio to the left bank is relatively lean and is closer to the combustion limit air-fuel ratio. Accordingly, until the time point t1, the request air-fuel ratio to the left bank is set as the reference air-fuel ratio. After the time point t1, only the request air-fuel ratio to the right bank is returned to soichiometry. Therefore, after the time point 1, the request air-fuel ratio to the right bank which is closer to the combustion limit air-fuel ratio is set as the reference air-fuel ratio. Furthermore, after the time point t2, the request air-fuel ratio to the left bank is also returned to stoichiometry, but the request air-fuel ratio to the right bank is also stoichiometry, and therefore, the reference air-fuel ratio is kept at stoichiometry.

According to the present embodiment, with the air-fuel ratio closer to the combustion limit air-fuel ratio being set as the reference air-fuel ratio, calculation of the target air quantity and calculation of the ignition timing are performed, and therefore, reliability of ensuring suitable combustion can be enhanced.

Embodiment 3

Embodiment 3 of the present invention will be described with reference to the drawing.

Figure 4:
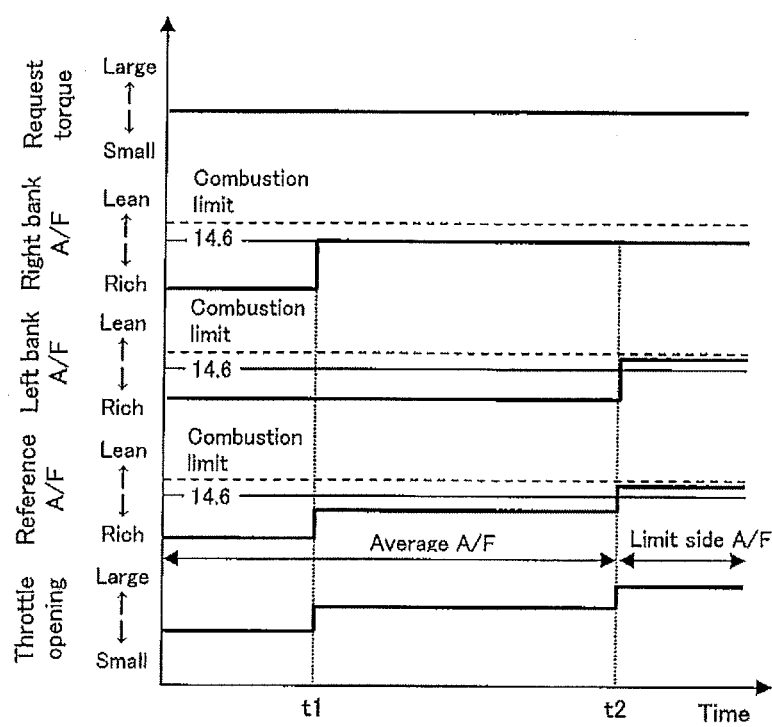
FIG. 4 is a diagram for describing a setting method of a reference air-fuel ratio according to embodiment 3 of the present invention.

The present embodiment has a feature in the method for setting the reference air-fuel ratio by the reference air-fuel ratio setting section 40, similarly to embodiment 2. In the present embodiment, when both of the request air-fuel ratios to the left and the right banks are apart from the combustion limit air-fuel ratio by a predetermined value or more, an air-fuel ratio which is a result of averaging the request air-fuel ratios to the left and the right banks is set as the reference air-fuel ratio. In contrast with this, when the difference of any one of the request air-fuel ratios to the left and the right banks and the combustion limit air-fuel ratio is smaller than the predetermined value, the air-fuel ratio which is closer to the combustion limit air-fuel ratio is set as the reference air-fuel ratio. For example, in a case shown in FIG. 4, both of the request air-fuel ratios to the left and the right banks are apart from the combustion limit air-fuel ratio by the predetermined value or more until the time point t2. Therefore, the average value of the request air-fuel ratios to the left and the right banks is set as the reference air-fuel ratio. After the time point t2, the difference between the request air-fuel ratio to the left bank and the combustion limit air-fuel ratio is reduced to be less than the predetermined value, and therefore, the request air-fuel ratio to the left bank is set as the reference air-fuel ratio.

According to the present embodiment, in a situation in which the request air-fuel ratio is apart from the combustion limit air-fuel ratio, the target air quantity is calculated with the average value of the request air-fuel ratios to the left and the right banks as the reference air-fuel ratio, and therefore, the torque which is substantially the request torque or is close to the request torque can be realized as the entire engine. When the request air-fuel ratio of any one of the left and the right banks is close to the combustion limit air-fuel ratio, the request air-fuel ratio which is close to the combustion limit air-fuel ratio is set as the reference air-fuel ratio, whereby calculation of the target air quantity and calculation of the ignition timing are performed, and therefore, reliability with which suitable combustion is ensured can be enhanced.

Embodiment 4

Embodiment 4 of the present invention will be described with reference to the drawing.

Figure 5:
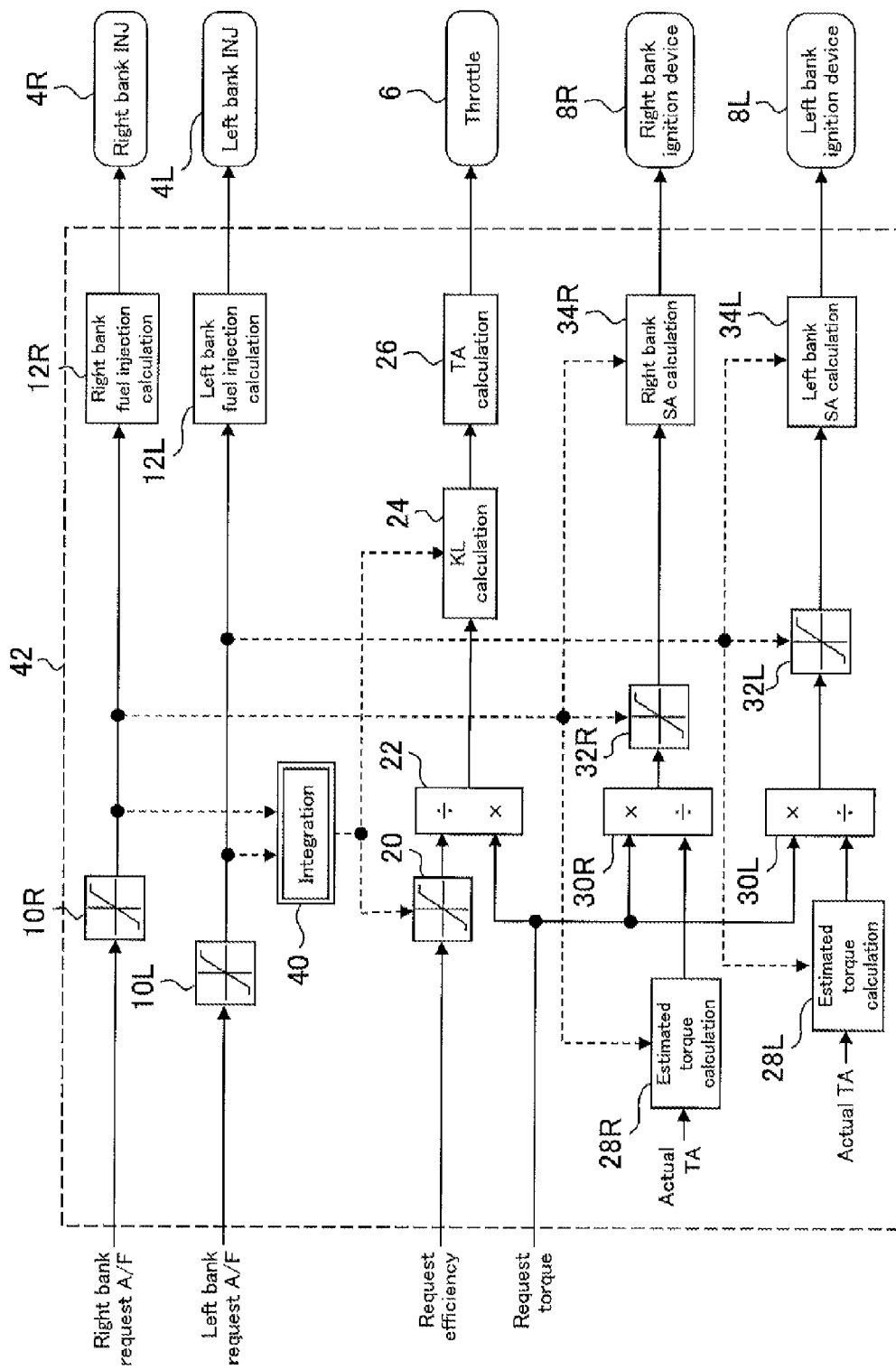
FIG. 5 is a block diagram showing a configuration of a control device of embodiment 4 of the present invention.

The present embodiment has a feature in a configuration of a control device, in particular, a configuration relating to ignition timing control. FIG. 5 is a block diagram showing a configuration of a control device 42 of the present embodiment. In FIG. 5, common elements in the functions to the control device 2 of embodiment 1 are assigned with the same reference signs. In the following, the description of the elements common to embodiment 1 will be omitted or simplified, and a feature of the control device 42 of the present embodiment will be described with an emphasis placed on the elements differing from those in embodiment 1.

In the present embodiment, control systems of ignition timing are provided as separate systems respectively at the right bank and the left bank. Estimated torque calculating sections 28R and 28L in which the actual throttle opening (actual TA) is inputted are also provided in association with the respective banks. In the estimated torque calculating section 28R for the right bank, a request air-fuel ratio to the right bank is used for search of the torque map for converting an estimated air quantity into estimated torque. That is to say, in the estimated torque calculating section 28R, torque which is estimated to be realized by the estimated air quantity under the request air-fuel ratio to the right bank is calculated. In contrast with this, in the estimated torque calculating section 28L for the left bank, torque that is estimated to be realized by the estimated air quantity under the request air-fuel ratio to the left bank is calculated.

Ignition timing controlling efficiency calculating sections 30R and 30L are provided in association with the respective banks. Further, combustion, limit guard sections 32R and 32L are also provided in association with the respective banks. In the combustion limit guard section 32R for the right bank, setting of an efficiency guard value of the combustion limit guard section 32R is performed with the request air-fuel ratio to the right bank as a reference. In contrast with this, in the combustion limit guard section 32L for the left bank, setting of an efficiency guard value of the combustion limit guard section 32L is performed with the request air-fuel ratio to the left bank as a reference.

Furthermore, ignition timing calculating sections 34R and 34L are also provided in association with the respective banks. In the ignition timing calculating section 34R for the right bank, the request air-fuel ratio to the right bank is used for search of a map for calculating optimal ignition timing and a retard amount. In the ignition timing calculating section 34L for the left bank, the request air-fuel ratio to the left bank is used for search of the similar map. The control device 42 performs operation of the ignition device 8R of the right bank in accordance with the ignition timing calculated in the ignition timing calculating section 34R for the right bank, and performs operation of the ignition device 8L of the left bank in accordance with the ignition timing calculated in the ignition timing calculating section 34L for the left bank.

As described above, in the present embodiment, torque (estimated torque) which can be actually generated in the banks is calculated in each of the estimated torque calculating sections 28R and 28L, and control of the ignition timing is performed for each of the banks so as to compensate a difference between the estimated torque and the request torque by correction of the ignition timing. In the ignition timing control, the request air-fuel ratios to the respective banks are used instead of a reference air-fuel ratio, on the occasion of calculating optimal ignition timing and the retard amount. Thereby, according to the present embodiment, the torque which is actually generated in each of the banks can be made in association with the request torque, and the request torque can be also realized with very high precision as the entire engine.

Others

The embodiments of the present invention are described above, but the present invention is not limited to the aforementioned embodiments, and can be carried out by being variously modified within the range without departing from the gist of the present invention. For example, in the aforementioned embodiments, the present invention is applied to the V-type engine, but the present invention can be also applied to other type engines including an inline type engine as long as the engines are such engines that cylinders are divided into a plurality of cylinder groups and air-fuel ratio control can be performed for each of the cylinder groups.

Further, in the aforementioned embodiment, the left and the right banks are respectively cylinder groups, but the number of cylinder groups of the engine to which the present invention is applicable is not limited to two. The present invention can also be applied to the engines having three or more cylinder groups, if only operation with the air-fuel ratio which differs at each of the cylinder groups can be performed.

Further, as the method for setting the reference air-fuel ratio, a method other than the methods of the embodiments described above can also be adopted. For example, the leanest request air-fuel ratio out of the request air-fuel ratios to the respective cylinder groups can also be set as the reference air-fuel ratio. In contrast with this, the richest request air-fuel ratio can be set as the reference air-fuel ratio. The request air-fuel ratio which is the closest to stoichiometry can also be set as the reference air-fuel ratio. In any case, the reference air-fuel ratio is within the range from the leanest air-fuel ratio to the richest air-fuel ratio out of the request air-fuel ratios to the respective cylinder groups, and therefore, excess or deficiency of the target air quantity with respect to the truly necessary air quantity to realize the request torque is suppressed to be small.

Further, in the aforementioned embodiments, the torque, the air-fuel ratios and the efficiencies are used as the control variables of the engine, but only the torque and the air-fuel ratio may be used as the control variables of the engine. That is to say, the efficiency can be always fixed to 1. In that case, the target torque is directly calculated as the air quantity controlling torque.

DESCRIPTION OF REFERENCE NUMERALS

2, 42 Control device
4R, 4L Fuel injection device
6 Throttle
8, 8R, 8L Ignition device
10R, 10L Combustion limit guard section
12R, 12L Fuel injection amount calculating section
20 Combustion limit guard section
22 Air quantity controlling torque calculating section
24 Target air quantity calculating section
26 Target throttle opening calculating section
28, 28R, 28L Estimated torque calculating section
30, 30R, 30L Ignition timing controlling efficiency calculating section
32, 32R, 32L Combustion limit guard section
34, 34R, 34L Ignition timing calculating section
40 Reference air-fuel ratio setting section

The invention claimed is:

1. A control device for an internal combustion engine that can be operated with a different air-fuel ratio at each of a plurality of cylinder groups, and is configured to control quantities of air that is taken into respective cylinders of the plurality of cylinder groups with one throttle, comprising:

request torque acquiring means for acquiring request torque to the internal combustion engine;

request air-fuel ratio acquiring means for acquiring a request air-fuel ratio to each of the plurality of cylinder groups;

reference air-fuel ratio setting means for setting a reference air-fuel ratio within a range from the leanest air-fuel ratio to the richest air-fuel ratio out of the request air-fuel ratios to the respective cylinder groups;

target air quantity calculating means for calculating a target air quantity for realizing the request torque under the reference air-fuel ratio, based on data that defines a relation between torque generated by the internal combustion engine and an air quantity in relation to an air-fuel ratio;

throttle opening control means for controlling an opening of the throttle in accordance with the target air quantity;

fuel injection amount control means for controlling fuel injection amounts of the respective cylinders in accordance with the request air-fuel ratios to the respective cylinder groups;

estimated torque calculating means for calculating an estimated torque, which is a torque estimated to be achieved under an optimum ignition timing, based on an estimated air quantity calculated from a current opening of the throttle and the reference air-fuel ratio;

ignition timing controlling efficiency calculating means for calculating an ignition timing controlling efficiency, which is a ratio of the request torque to the estimated torque;

combustion limit guard means for specifying a combustion limit efficiency corresponding to the reference air-fuel ratio, based on a data which defines for every air-fuel ratio a minimum efficiency with which suitable combustion is secured, and limiting a minimum value of the ignition timing controlling efficiency with the combustion limit efficiency as a guard value; and ignition timing control means for calculating a retard amount with respect to the optimal ignition timing from the ignition timing controlling efficiency, and controlling ignition timing of the respective cylinders in accordance with the retard amount.

2. The control device for an internal combustion engine according to claim 1,
wherein the reference air-fuel ratio setting means sets an air-fuel ratio obtained by averaging the request air-fuel ratios to the respective cylinder groups as the reference air-fuel ratio.

3. The control device for an internal combustion engine according to claim 1,
wherein the reference air-fuel ratio setting means sets an air-fuel ratio that is the closest to a combustion limit air-fuel ratio of the request air-fuel ratios to the respective cylinder groups, as the reference air-fuel ratio.

4. The control device for an internal combustion engine according to claim 1,
wherein in cases where all of the request air-fuel ratios to the respective cylinder groups are apart from a combustion limit air-fuel ratio by a predetermined value or more, the reference air-fuel ratio setting means sets an air-fuel ratio that is obtained by averaging the request air-fuel ratios to the respective cylinder groups as the reference air-fuel ratio, and in cases where a difference between any one of the request air-fuel ratios to the respective cylinder groups and the combustion limit air-fuel ratio is less than the predetermined value, the reference air-fuel ratio setting means sets an air-fuel ratio that is the closest to the combustion limit air-fuel ratio as the reference air-fuel ratio.

5. A control device for an internal combustion engine that can be operated with a different air-fuel ratio at each of a plurality of cylinder groups, and is configured to control quantities of air that is taken into respective cylinders of the plurality of cylinder groups with one throttle, comprising:
a request torque acquiring section that acquires request torque to the internal combustion engine;
a request air-fuel ratio acquiring section that acquires a request air-fuel ratio to each of the plurality of cylinder groups;
a reference air-fuel ratio setting section that sets a reference air-fuel ratio within a range from the leanest air-fuel ratio to the richest air-fuel ratio out of the request air-fuel ratios to the respective cylinder groups;
a target air quantity calculating section that calculates a target air quantity for realizing the request torque under the reference air-fuel ratio, based on data that defines a relation between torque generated by the internal combustion engine and an air quantity in relation to an air-fuel ratio;
a throttle opening control section that controls an opening of the throttle in accordance with the target air quantity;
a fuel injection amount control section that controls fuel injection amounts of the respective cylinders in accordance with the request air-fuel ratios to the respective cylinder groups;
an estimated torque calculating section that calculates an estimated torque, which is a torque estimated under an optimum ignition timing, based on an estimated air quantity calculated from a current opening of the throttle and the reference air-fuel ratio;
an ignition timing controlling efficiency calculating section that calculates an ignition timing controlling efficiency, which is a ratio of the request torque to the estimated torque;
a combustion limit guard section that specifies a combustion limit efficiency corresponding to the reference air-fuel ratio, based on a data which defines for every air-fuel ratio a minimum efficiency with which suitable combustion is secured, and limits a minimum value of the ignition timing controlling efficiency with the combustion limit efficiency as a guard value; and
an ignition timing control section that calculates a retard amount with respect to the optimal ignition timing from the ignition timing controlling efficiency, and controls ignition timing of the respective cylinders in accordance with the retard amount.

6. The control device for an internal combustion engine according to claim 5,
wherein the reference air-fuel ratio setting section sets an air-fuel ratio obtained by averaging the request air-fuel ratios to the respective cylinder groups as the reference air-fuel ratio.

7. The control device for an internal combustion engine according to claim 5,
wherein the reference air-fuel ratio setting section sets an air-fuel ratio that is the closest to a combustion limit air-fuel ratio of the request air-fuel ratios to the respective cylinder groups, as the reference air-fuel ratio.

8. The control device for an internal combustion engine according to claim 5,
wherein in cases where all of the request air-fuel ratios to the respective cylinder groups are apart from a combustion limit air-fuel ratio by a predetermined value or more, the reference air-fuel ratio setting section sets an air-fuel ratio that is obtained by averaging the request air-fuel ratios to the respective cylinder groups as the reference air-fuel ratio, and in cases where a difference between any one of the request air-fuel ratios to the respective cylinder groups and the combustion limit air-fuel ratio is less than the predetermined value, the reference air-fuel ratio setting section sets an air-fuel ratio that is the closest to the combustion limit air-fuel ratio as the reference air-fuel ratio.

* * * * *